United States Patent

[11] 3,586,941

| [72] | Inventor | Tadao Fujimaki<br>Tokyo, Japan |
|---|---|---|
| [21] | Appl. No. | 844,102 |
| [22] | Filed | July 23, 1969 |
| [45] | Patented | June 22, 1971 |
| [73] | Assignee | Tokyo Electrical Engineering College<br>Tokyo, Japan |
| [32] | Priority | Aug. 1, 1968 |
| [33] | | Japan |
| [31] | | 43/54538 |

[54] COMPENSATING SYSTEM FOR A SERIES SERVOMOTOR
10 Claims, 10 Drawing Figs.

[52] U.S. Cl........................................................ 318/246,
318/247, 318/409, 318/431
[51] Int. Cl........................................................ H02p 7/14
[50] Field of Search............................................ 318/246,
247, 248, 409, 431

[56] References Cited
UNITED STATES PATENTS

| 3,134,065 | 5/1964 | Minarik.......................... | 318/430 |
| 3,336,516 | 8/1967 | Kelley............................ | 318/248 |
| 3,458,791 | 7/1969 | Boice............................. | 318/431 |
| 3,493,776 | 2/1970 | Porter............................ | 318/430 |

*Primary Examiner*—Oris L. Rader
*Assistant Examiner*—K. L. Crosson
*Attorney*—Kelman and Berman ABSTRACT: A compensating system for a series servomotor which improves various characteristics of the motor by causing same to operate as a separately excited motor when its control voltage is low and as a series motor when its control voltage is increased.

INVENTOR.
Tadao Fujimaki
BY: Kelman and Berman
AGENTS

INVENTOR.
Tadao Fujimaki
BY: Kelman and Berman
AGENTS

INVENTOR.
Tadao Fujimaki
BY: Kelman and Berman
AGENTS

COMPENSATING SYSTEM FOR A SERIES SERVOMOTOR

The present invention relates to systems for compensating various characteristics of a servomotor. In particular, the invention is concerned with a compensating system for a series servomotor which improves the starting characteristics of a direct current series servomotor by reducing the insensitive range of its applied voltage rate characteristics.

Direct current series motors have high starting torque and constant output power characteristics. A control servomotor utilizing these characteristics has been put into practical use in the form of a servomotor of the series split field type. However, such servomotor has generally been limited to the small size type.

The existence of the insensitive range of the applied voltage rate characteristics of a servomotor due to friction of brushes or the like has deleterious effect on the characteristics of a servosystem. No proposals for effectively obviating these problems have ever been made.

Accordingly, an object of the present invention is to provide a compensating system which permits to reduce the insensitive range of the applied voltage rate characteristics of a direct current series servomotor and to improve its characteristics in general.

Another object of the invention is to provide a servomotor which has characteristics such that it operates as a separately excited motor when its control voltage is low and which operates as a series motor when its control voltage is increased.

Additional objects as well as features and advantages of this invention will become apparent from the description set forth hereinafter when considered in conjunction with the accompanying drawings, in which.

Figure 1:
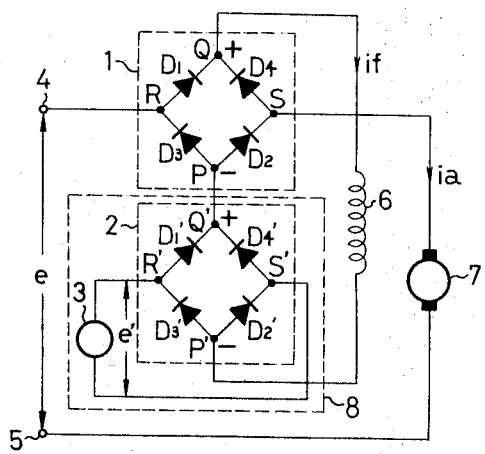
FIG. 1 is a circuit diagram of one embodiment of the system according to this invention.

One embodiment will now be explained with reference to FIG. 1. In the FIG. 1 is a rectifying bridge circuit which is composed of rectifying elements D1 to D4. 2 is also a bridge rectifying circuit which is composed of rectifying elements D1' to D4'. Said rectifying circuits 1 and 2 are connected in series to each other on their direct current side or at points P and Q' to form a series circuit which is connected to a field winding 6 of a direct current series servomotor at opposite points Q and P'. 7 is the armature of the direct current series servomotor connected in series to one bridge rectifying circuit 1 on its alternating current side at points R and S. A control voltage $e$ is applied to this series circuit through terminals 4 and 5. 3 is a compensating power source which supplies a compensating voltage $e'$ to points R' and S' on the alternating current side of the other bridge rectifying circuit 2. The power source 3 may be either a direct current source or alternating current source. If a suitable value of the compensating voltage $e'$ is selected in conformity with the capacity of the servomotor, a compensating current (field current) $if$ flowing in the same direction at all times will flow to the field winding 6. This current $if$ will cause a magnetic flux to be formed in the field winding 6 at all times.

The torque of a servomotor is proportional to the product of the magnetic flux and the armature current. Therefore, if the control voltage $e$ is increased gradually from zero, then the servomotor will start its operation even when the control voltage is at a relatively low level because of the existence in the field winding of the magnetic flux formed by said compensating current. The servomotor operates in two different manners depending on the circuit constant, load, compensating current and control voltage. One manner of operation is such that all the rectifying elements D1 to D4 of the rectifying circuit 1 are fired, and the other manner of operation is such that only the two opposed rectifying elements D1 and D2 or D3 and D4 of the rectifying circuit 1 are fired. The servomotor exhibits separate excitation characteristics when $ia < if$ and exhibits series characteristics when $ia = if$ where $ia$ is the armature current and $if$ is the magnetic filed current. These points will be explained in detail hereinafter.

Figure 2:
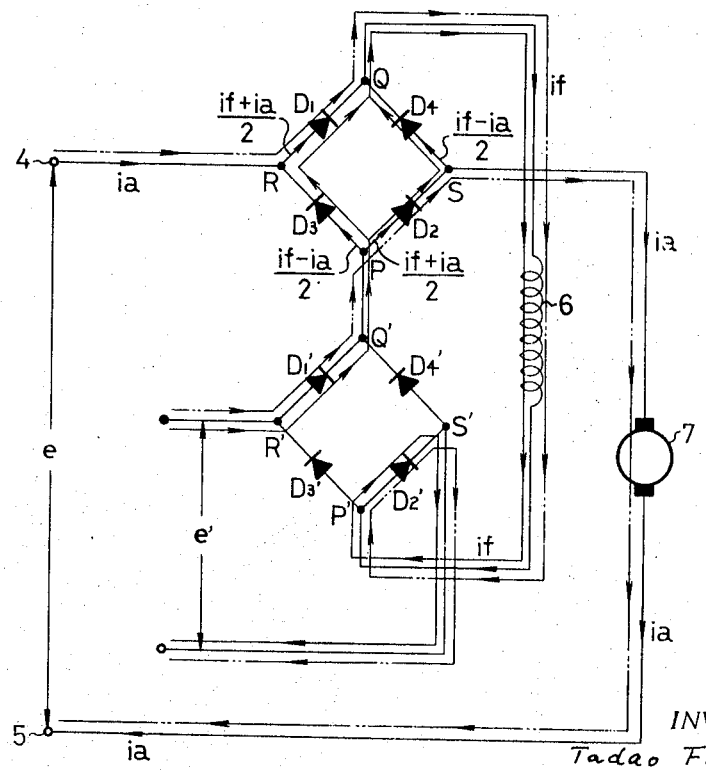
FIGS. 2 and 3 are a circuit diagram and a fragmentary circuit diagram respectively used in the explanation of the operation of the embodiment of FIG. 1.

Assuming that the control voltage $e$ is zero and the compensating voltage $e'$ is applied such that R' is on the positive side, the compensating voltage $e'$ will cause the compensating current $if$ to flow in the direction of solid arrow of FIG. 2 to the field winding 6 as a field current. The current will be divided into two currents $if/2$ each of which flows to the rectifying elements D1, D2, D3 and D4 to fire them all. The differences in potential between the points P and Q (direct current side) and between the points R and S (alternate current side) is zero. If the resistances in the normal direction offered by the rectifying elements D1 to D4 and D'1 to D'4 and hence a reduction in voltage in the normal direction is disregarded, the compensating voltage $e'$ will be applied to opposite ends of the field winding 6.

When this is the case, the control voltage $e$ is applied between the terminals 4 and 5 such that the terminal 4 is on the opposite side. The current $ia$ which flows at this time will flow in the direction shown by the dot-and-dash arrow of FIG. 2. However, when the control voltage $e$ is relatively low and the current $ia$ is lower in value than the compensating current $if$, the current flowing to the field winding 6 is forcibly limited to the constant current $if$ which is decided by the impedance of the field circuit (which is the field winding impedance since the resistances in the normal direction offered by the rectifying elements are disregarded) and the compensating voltage $e'$, so that the current $ia$ flows to the armature 7.

Figure 3:
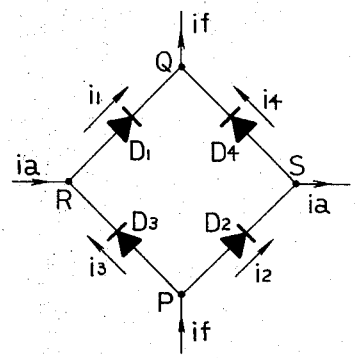

Since the current $if$ flows to the field winding 6 and the current $ia$ flows to the armature 7 as aforementioned, the following formulas (1) to (4) will hold if Kirchhoff's law is applied to the rectifying circuit 1 and the current in each portion is decided as shown in FIG. 3 by taking the direction of the current into consideration:

$$i2 + i3 = \quad (1)$$

$$i1 + i4 = \quad (2)$$

$$i1 - i3 = \quad (3)$$

$$i2 - i4 = \quad (4)$$

From formulas (1) and (3) and formulas (1) and (4), the following formulas can be obtained respectively:

$$i1 + i2 = +ia \quad (5)$$

$$i3 + i4 = -ia \quad (6)$$

Since the rectifying bridge circuits are symmetrical, $i1 = i2$ and $i3 = i4$, so that the following formulas can be obtained from the formulas (5) and (6) respectively:

$$i1 = i2 = (if + ia)/2$$

$$i3 = i4 = (if - ia)/2$$

When this is the case, the current $(if + ia)/2$ flows to the rectifying elements D1 and D2 and the current $(if - ia)/2$ flows to the rectifying elements D3 and D4 as shown in FIG. 3.

As stated above, the field circuit and the armature circuit will operate independently of each other, with the compensating current flowing to the field winding 6 as the filed current $if$ and the current caused by the control voltage $e$ flowing to the armature 7 as the armature current $ia$ separately and independently of the field current. This causes the servomotor to operate as a separately excited motor. This state of operation continues till the rectifying elements D3 and D4 are rendered inoperative or $ia$ becomes equal to $if$ as the result of an increase in the control voltage $e$.

When the armature current $ia$ is made equal to the field current $if$ as the result of an increase in the control voltage $e$, the current flowing to the rectifying elements D3 and D4 $(if-ia)/2$ will become zero, thereby rendering the elements D3 and D4 inoperative. Also, the current flowing to the rectifying elements D1 and D2 $(if+ia)/2$ will become equal to $ia$, and hence to $if$. As soon as $ia$ becomes equal to $if$, the control voltage $e$, field winding 6, compensating power source 3 and armature 7 are connected in series to the bridge rectifying circuit 1, with the current of the same value flowing through this series circuit. This causes the servomotor to operate as a series motor.

Figure 4:
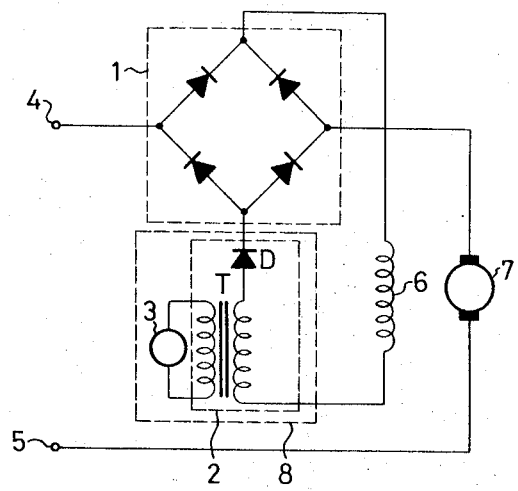
FIGS. 4 to 6 are circuit diagrams of other embodiments of the system according to this invention.
Figure 5:
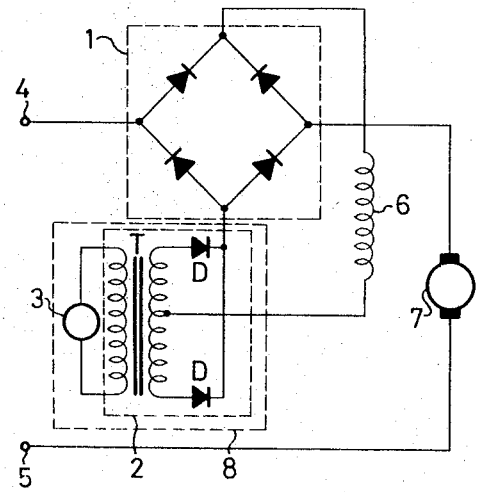
Figure 6:
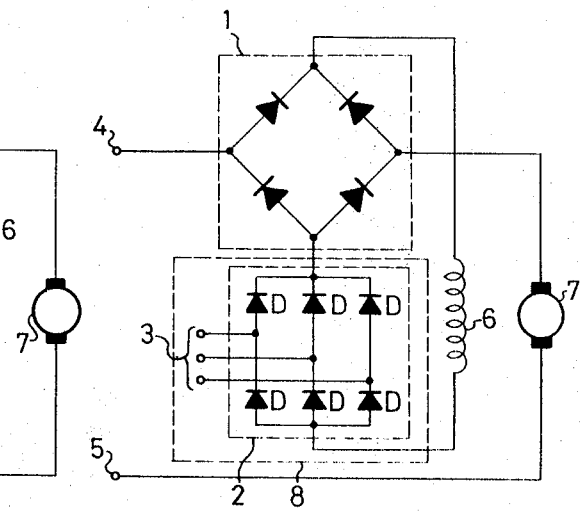

In the embodiment of the present invention just described, the rectifying circuit 2 on the field side is a rectifying bridge circuit. Alternatively, a single-phase half-wave rectifying circuit composed of a transformer T and a rectifying element D as shown in FIG. 4, a single-phase full-wave rectifying circuit composed of a transformer T and two rectifying elements D as shown in FIG. 5 or a three-phase full wave rectifying circuit composed of six rectifying elements D as shown in FIG. 6 may be used in place of the rectifying bridge circuit. If the rectifying circuit 2 on the field side is a single-phase rectifying circuit as shown in FIG. 4 and FIG. 5 or a three-phase circuit as shown in FIG. 6 or a multiphase rectifying circuit in general, the compensating power source used must be an alternating current source. However, if the rectifying circuit is a rectifying bridge circuit as shown in FIG. 1, the power source used may be either an alternating current source or direct current power source.

When the compensating power source is a direct current source, the rectifying circuit 2 can be eliminated by connecting said direct current source in series to the direct current side of the bridge rectifying circuit 1, or by connecting the positive terminal to the point P and the negative terminal to one end of the field winding 6. Therefore, a portion designated 8 in the drawings may be said to be a compensating direct current source for supplying a direct current to the field winding 6 through the direct current side of the bridge rectifying circuit 1.

It will readily be understood that if the control voltage $e$ is applied between the terminals 4 and 5 such that the side of the terminal 5 is positive, the current flowing to the field winding 6 will flow in the same direction at all times and that only the current flowing to the armature 7 will vary its direction, whereby the operation of the servomotor can be reversed.

In order that the advantages offered by the compensating system according to this invention may be fully understood, the results of tests conducted on a servomotor embodying the compensating system of this invention will now be explained. The results of tests are shown in the form of graphs in FIGS. 7 to 10. The servomotor used in the experiments is a series servomotor of a rate voltage of 1,000 volts, rated current of 0.35 ampere, rated output power of 10 watts, and the number of rotation of 4,000 r.p.m.

Figure 7:
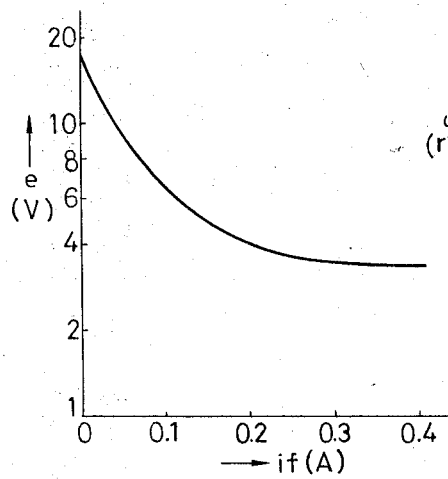
FIG. 7 shows the no-load starting voltage characteristics of the system according to this invention.

FIG. 7 shows the no-load starting voltage characteristics of the servomotor incorporating the compensating system according to this invention. FIG. 7 shows the results of tests conducted on the voltages which start the servomotor by gradually increasing the control voltage $e$ while using the compensating current $if$ (A) as a parameter. It will be seen from the FIGURE that the no-load starting voltage $e$ is about 17 volts when no compensating current $if$ is passed (as is the case with a conventional series servomotor), and that the no-load starting voltage is reduced to about 4 volts when the compensating current of 0.2 ampere (about 57 percent of the rated value) is passed.

Figure 8:
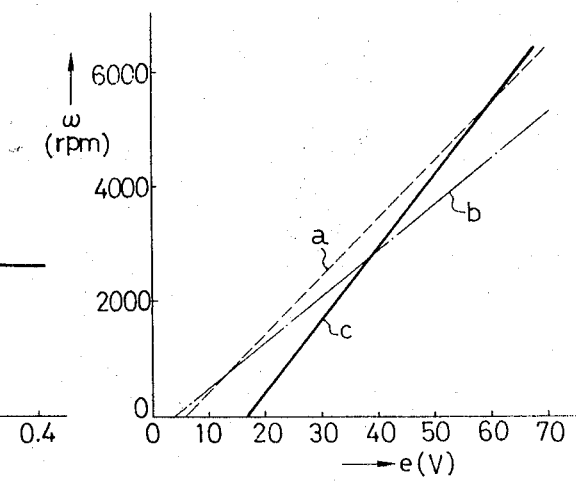
FIG. 8 shows the voltage rate characteristics of the system according to this invention.

FIG. 8 which shows the voltage rate characteristics of the servomotor incorporating the compensating system according to this invention shows a constant rate $w$ in relation to the control voltage $e$ by using the compensating current $if$ as a parameter in no-load operation.

A line (a) is obtained when the compensating current $if$ is 0.175 ampere, a line (b) when $if$ is 0.35 ampere, and a line (c) when $if$ is zero. It will be seen from the results of tests shown in FIG. 8 that the higher the compensating current, the lower is the voltage at which the servomotor can be started.

Stated differently, an increase in the value of the compensating current can reduce the time which elapses before the servomotor responds to the voltage applied, although limits are set to the maximum value of the compensating current by the necessity of preventing an excessive rise in the temperature in the motor.

Figure 9:
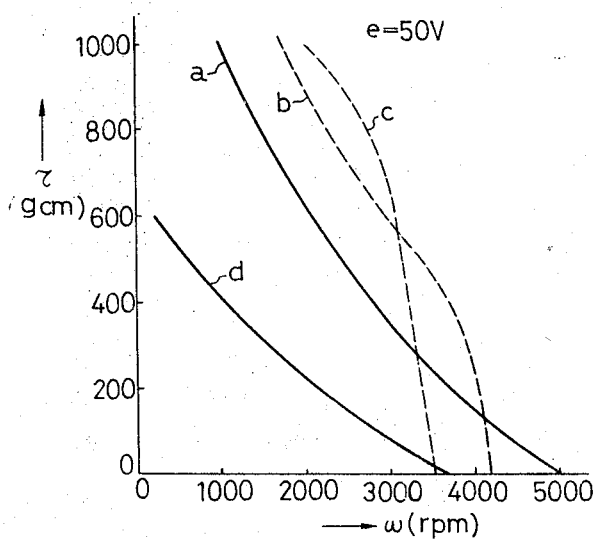
FIG. 9 shows the rate-torque characteristics of the system according to this invention.

FIG. 9 shows the rate torque characteristics of the servomotor incorporating the compensating system according to this invention. The FIGURE shows a torque $\tau$ in relation to the rate $w$ by using the compensating current $if$ as a parameter when the control voltage $e$ of 50 volts is applied. A line (a) is obtained when the compensating current $if$ is 0.1 ampere, a line (b) when $if$ is 0.2 ampere, and a line (d) when $if$ is zero. It will be evident that the motor exhibits series characteristics when the load is high and exhibits separate excitation characteristics when the load is low.

Figure 10:
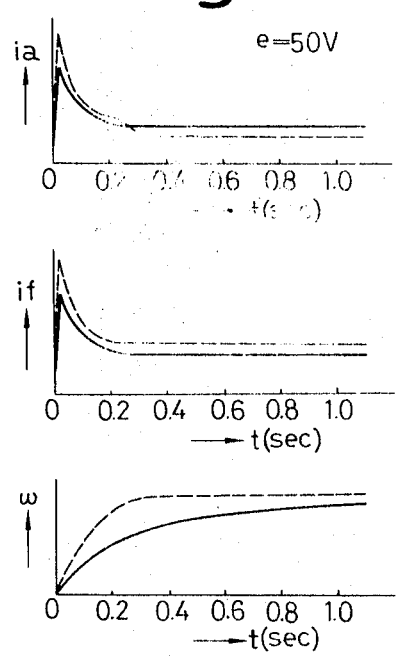
FIG. 10 shows the step response characteristics of the system according to this invention.

FIG. 10 shows the armature current $ia$, field current $if$ and rate $w$ in relation to a time $t$ when the control voltage $e$ of 50 volts is applied. Solid lines shown the values obtained when no compensating current is passed, and broken lines shown the values obtained when the compensating current of 175 milliamperes is passed. From the FIGURE, it will be seen that the response rate is substantially increased when the compensating current is used.

From the description set forth hereinabove, it will be appreciated that according to the present invention, there is provided a compensating system for a series servomotor in which a current is passed at all times from a compensating direct current source to a field winding through the direct current side of a rectifying bridge circuit, and an armature is connected in series to the alternating current side of said rectifying bridge circuit to form a series circuit to which a control voltage is applied. The compensating system according to this invention as described above gives separate excitation characteristics to the servomotor when a current passed to the armature by the control voltage is smaller in value than a current flowing from the compensating direct current source to the field winding and gives series characteristics thereto when the first mentioned current is equal in value to the last mentioned current. The motor can automatically be switched from separate excitation characteristics to series characteristics or vice versa according to the compensation system of this invention.

The compensating system according to this invention offers many advantages. It permits the reduction of the insensitive range of the applied voltage rate characteristics of the servomotor. Since the servomotor operates as a separately excited motor when its control input is low, it develops a high torque and accordingly it can be started even when the voltage applied thereto is low.

Another advantage lies in the fact that the servomotor incorporating the compensating system according to this invention exhibits both separate excitation characteristics and series characteristics, and switches between these characteristics automatically.

Accordingly, when the servomotor which can be switched automatically from separate excitation characteristics to series characteristics or vice versa is used to form a closed loop system, this feature makes it possible to cause the motor to act as a series servomotor when there are large fluctuations in the control system and to act as a separately excited servomotor when the fluctuations are reduced, because the voltage applied to the servomotor is generally increased when there are large fluctuations in the control system, though the situation may vary depending on the load.

Still another advantage lies in the fact that the compensating system according to this invention permits to reduce the voltage required for starting the motor and to increase the response rate of the motor. Since the compensating current causes a magnetic flux to exist in the field winding at all times, response characteristics as well as starring characteristics of the motor can be improved.

While the invention has been shown and described with reference to preferred embodiments thereof, it is to be understood that there is no intention to limit the invention to the disclosed circuits and it is intended to cover all alternative embodiments and circuits falling within the scope of the following claims.

What we claim is:

1. A circuit for improving the starting characteristics of a series-wound, direct current servomotor having an armature winding and a field winding connectable to a source of DC control voltage, which comprises:
    a first rectifying bridge circuit having first and second AC terminals and first and second DC terminals, the armature winding of said servomotor being serially connected with said source of the DC control voltage, across said first and second AC terminals; and
    compensating means, serially connected with said field winding across said first and second DC terminals, for supplying a continuous, unidirectional field current to said servomotor, regardless of the magnitude or direction of the current flowing through the armature winding thereof, a similarly poled pair of the rectifying elements in said first bridge circuit becoming back-biased when the magnitude of said DC control voltage increases to the point where said armature current equals or exceeds said field current, thereby effectively placing said armature winding in series with said field winding for normal operation of said servomotor.

2. The circuit according to claim 1 wherein said compensating means comprises a second rectifying bridge circuit having first and second AC terminals and first and second DC terminals, the DC terminals of said second bridge circuit being included in the series connection of said field winding and the DC terminals of said first bridge circuit; and
    circuitry connecting the AC terminals of said second bridge circuit to a compensating voltage source.

3. The circuit according to claim 2 wherein said compensating voltage source is a direct current source.

4. The circuit according to claim 2 wherein said compensating voltage source is an alternating current source.

5. The circuit according to claim 1 wherein said compensating means comprises:
    a single phase, half-wave rectifying circuit; and
    circuitry connecting said rectifying circuit to a single phase AC source.

6. The circuit according to claim 5, wherein said single-phase, half-wave rectifying circuit includes a transformer having a primary winding and a secondary winding, said primary winding being connected to said AC source and said secondary winding being serially connected with said field winding to a rectifying diode.

7. The circuit according to claim 1 wherein said compensating means comprises:
    a single-phase, full-wave rectifying circuit; and
    circuitry connecting said rectifying circuit to a single-phase AC source.

8. The circuit according to claim 7 wherein said single-phase, full-wave rectifier includes a transformer, having a primary winding and a center-tapped secondary winding, said primary winding being connected to said AC source, said center-tap being connected to said field winding, and a pair of rectifying diodes connecting the outermost terminals of said secondary winding to said first bridge circuit.

9. The circuit according to claim 1 wherein said compensating means comprises:
    a three-phase, full-wave rectifying circuit; and
    circuitry connecting said rectifying circuit to a three-phase AC source.

10. The circuit according to claim 9, wherein said three-phase, full-wave rectifying circuit includes three pairs of serially-connected, rectifying diodes, connected in parallel, in series with the field coil of said servomotor, the center tap of each pair of serially-connected, rectifying diodes being connected to respective phases of said three-phase AC source.